(12) United States Patent
Taguchi et al.

(10) Patent No.: US 7,445,870 B2
(45) Date of Patent: Nov. 4, 2008

(54) ORGANIC ELECTROLYTE BATTERY

(75) Inventors: Tomohiro Taguchi, Ueda (JP); Kenichiro Nakahara, Suita (JP); Yukinori Hato, Nishitokyo (JP)

(73) Assignee: Taiyo Yuden Co., Ltd., Taito-ku, Tokyo (JP)

( * ) Notice: Subject to any disclaimer, the term of this patent is extended or adjusted under 35 U.S.C. 154(b) by 552 days.

(21) Appl. No.: 10/476,054

(22) PCT Filed: Apr. 25, 2002

(86) PCT No.: PCT/JP02/04190

§ 371 (c)(1), (2), (4) Date: Apr. 27, 2004

(87) PCT Pub. No.: WO02/089245

PCT Pub. Date: Nov. 7, 2002

(65) Prior Publication Data

US 2004/0185340 A1    Sep. 23, 2004

(30) Foreign Application Priority Data

Apr. 27, 2001    (JP) .............................. 2001-132846

(51) Int. Cl.
*H01M 4/02*    (2006.01)
*H01G 9/00*    (2006.01)

(52) U.S. Cl. ................ 429/209; 429/213; 361/500
(58) Field of Classification Search ................ 429/209, 429/213, 324, 122, 218.1
See application file for complete search history.

(56) References Cited

U.S. PATENT DOCUMENTS

| | | | |
|---|---|---|---|
| 5,750,287 A | | 5/1998 | Kinoshita et al. |
| 2005/0142446 A1 | * | 6/2005 | Yamamoto et al. ..... 429/231.95 |
| 2006/0240328 A1 | * | 10/2006 | Takami et al. ............... 429/329 |
| 2006/0251955 A1 | * | 11/2006 | Yata et al. ..................... 429/50 |

FOREIGN PATENT DOCUMENTS

| JP | H04-288361 A1 | | 10/1992 |
|---|---|---|---|
| JP | 08-64248 | * | 3/1996 |

* cited by examiner

*Primary Examiner*—Raymond Alejandro
(74) *Attorney, Agent, or Firm*—Law Office of Katsuhiro Arai

(57) ABSTRACT

The organic electrolyte cell that is suitable for application of direct current backup of pulse load with load width on the order of milliseconds and has higher backup capability than the conventional design is achieved by setting the product R·C of an impedance R (Ω) at 1 kHz and a capacity C (F) is in a range from 0.00002 to 0.05, and improving the balance of voltage drop during discharge over a specified load width on the order of milliseconds.

10 Claims, No Drawings

ORGANIC ELECTROLYTE BATTERY

TECHNICAL FIELD

The present invention relates to an organic electrolyte cell characterized in that the product R·C (hereinafter referred to as τ) of an impedance R (Ω) and a capacity C (F) is in a range from 0.00002 to 0.05 and is accordingly suitable for use as a direct current power source of load width in a particular range on the order of milliseconds.

BACKGROUND ART

Sudden voltage drop or power failure of mobile information apparatuses such as cellular phone and laptop computer causes not only an interruption of the functions of such equipment, but also erasure of information stored in the memory, thus resulting in serious troubles. As countermeasures against such troubles, various capacitors such as electrolytic capacitor and electric double layer capacitor (EDLC) and secondary batteries have been used to provide backup power. Mobile communication apparatuses such as cellular phone and PDA are required to make intermittent operations that cause voltage variations, and use power sources such as electrolytic capacitor to compensate for the variations.

Among such power sources, electric double layer capacitor and other capacitors of high capacity are particularly advantageous since the capacity per unit volume is as high as several hundreds or several thousands times that of conventional electrolytic capacitors. To make use of the high capacity, these capacitors have been widely used in the form of coin type and others, for backup power sources of portable devices such as cellular phone. In order to satisfactorily deal with instantaneous variable load by making use of the high capacity, it is important to have a high power.

A structure of capacitor having high capacity and high output power is disclosed, for example, in Japanese Unexamined Patent Publication No. 8-78057, and a cylindrical capacitor of 18650 size having the structure disclosed in the publication has been commercialized. Capacitors using organic electrolyte having high capacity and high power of cylindrical structure based on organic electrolyte have also been commercialized by other manufacturers.

In the meantime, there have been amazing advancements to make mobile information apparatuses such as cellular phones and laptop computers smaller in size and higher in functions, which make it necessary to support the higher data processing speed brought about by the higher functions and reduce the power consumption. Lower operating voltage and higher operating speed increase the importance of transient response performance to intermittent load, thus leading to ever greater variations in load on the power source.

As a result, small capacitors having lower ESR (equivalent series resistance) and higher capacity are required. In the case of data transmission via cellular phone, for example, since load width is increasing to the order of milliseconds due to the higher functions, the capacitors such as electrolytic capacitors that are used at present are reaching their limits of capacity, and accordingly there are increasing demands for improvements in the transient response performance of the power source.

As a measure to circumvent the problem of shortage in capacity, an attempt has been made with respect to the thickness of the electrode active material layers, for example, as described in Japanese Unexamined Patent Publication No. 8-45793. Although decreasing the thickness of the electrode active material layers is advantageous because it gives high power to the cell, it also has a problem of decreasing discharging capacity. The publication of the invention described above proposes a cell having high discharge capacity and high power characteristic that are achieved by combining electrodes having electrode active material layers of the thickness 300 μm and 20 μm so as to solve the problem described above.

Capacitors having high capacity such as electric double layer capacitor have overwhelming advantage over the electrolytic capacitor and the like in terms of capacity per unit cell volume. However it is not sufficient for a backup power source that is required to accommodate variable load of short load width on the order of microseconds. This is because, in the case of such applications as the load width is limited to a particular short period of time, importance is placed on balancing the capacity and the impedance in accordance to the load width rather than on high capacity. This is because the capacity and impedance determine the balance between the voltage drop caused by ESR and the voltage drop caused by the discharge of the electrical charge. Capacitors used at present are designed in such a manner as capacity and impedance are too high for the range of load width on the order of milliseconds, resulting in unsatisfactory balance which is difficult to improve. As a consequence, it is necessary to decrease the capacity and impedance.

There is increasing demand for improvements in the transient response performance of the power source so as to accommodate such large variable load as the load width is on the order of milliseconds due to the higher functions of mobile devices. To meet this demand, it is necessary to improve the balance between the voltage drop due to ESR and the voltage drop due to the discharge of the electrical charge, by setting such balance between capacity and impedance, different from those conventional electrolytic capacitors and EDLC, that corresponds to the load width on the order of milliseconds.

DISCLOSURE OF THE INVENTION

Now balance of voltage drop during discharge will be described in detail below. Balance of voltage drop refers to the ratio of the voltage drop due to ESR during discharge to the voltage drop due to the discharge of the electrical charge that has been accumulated.

Let the voltage drop during discharge be $\Delta V$ (V). $\Delta V$ can be represented by the sum of the voltage drop Vr due to ESR and the voltage drop Vc due to discharge of the electrical charge. While Vr is determined only by the current independent of the load width, Vc depends on both current and load width. Values of Vr and Vc are related to the balance of an impedance R and a capacity C for a given load condition. When balance of voltage drop is represented as Vr/Vc, the equation Vr/Vc=R·C/t holds because Vr=IR and Vc=I·t/C (where I denotes a current load, t denotes a load width, C denotes a capacity (F), and R denotes an impedance (Ω)).

Therefore, balance of voltage drop Vr/Vc can be represented by the ratio of the time constant (τ) of the cell that is given as τ=R·C to the load width (t). Commercialized capacitors have time constants that are determined by the configuration such as coin type or large cylindrical shape and mostly in a range from 1 to 50 seconds. Small electrolytic capacitors having volume of about 1 cc or less usually have time constants in a range from $1\times10^{-7}$ to $1\times10^{-6}$ seconds.

In case a small electrolytic capacitor is used with load width of several microseconds, value of Vr/Vc is unit (in a range from about 1/10 to 10), showing a good balance of voltage drop. In fact, capacitors are used as preferable power source with load width of several microseconds. This is an example of well-balanced impedance and capacity for the loading condition.

When the load width increases to the order of milliseconds, however, capacity of a small electrolytic capacitor is far short of the necessity. That is, balance of voltage drop worsens and the value of Vr/Vc deviates far from unit, such as $1/1000$ or $1/10000$. Although the load may be served by connecting the required number of small electrolytic capacitors in parallel, balance of voltage drop cannot be improved. Rather, the impedance becomes extremely low when a multitude of cells are connected in parallel to satisfy the capacity requirement. As a result, parallel connection of cells becomes overly low-impedance design.

The case is opposite for EDLC, in which case the need to lower the impedance inevitably leads to overly high capacity design. That is, using the EDLC that are available at present in an application of pulse backup for a short period of time results in impedance and capacity that are both too high for the load width. Consequently, parallel connection of multitude of cells must be employed thus resulting in overly low-impedance design. This leads to increased cell size because an excessive amount of electrode active material must be provided, thus resulting in an increase in the manufacturing cost. Therefore, it is important to determine the minimum necessary amount of electrode active material for the given load condition. While a high power does not necessarily mean the requirement for a high capacity, low impedance is a key factor for a pulse backup power source. Time constant may be in a range from 0.00002 to 0.05, which means the balance of voltage drop is in a range from $1/500$ to 500 for load width in a range from 0.1 to 10 msec, which is a great improvement over the value of several thousands that is common at present.

The present invention provides an organic electrolyte cell that can serve as a preferable power source in terms of performance, size and cost, on the basis of an idea that such a range of time constant that improves the backup capability can be achieved through improvement in the balance of voltage drop during discharge, for applications of direct current backup with pulse loads having load width on the order of milliseconds.

Load width on the order of milliseconds herein means, for example, a range from 0.1 to 10 msec.

According to an organic electrolyte cell comprising a positive electrode, a negative electrode and an organic electrolyte prepared by dissolving a salt in an aprotic organic solvent, wherein the time constant R·C, which is the product of an impedance R ($\Omega$) and a capacity C (F) is in a range from 0.00002 to 0.05, preferably from 0.0001 to 0.03, and more preferably from 0.0002 to 0.005, an improvement in balance can be achieved.

The organic electrolyte cell is also characterized in that the thickness of one side of the electrode active material layers is in a range from 0.01 to 16 µm, preferably from 0.05 to 10 µm, and more preferably from 0.08 to 2 µm.

In the organic electrolyte cell, the active material that constitutes the electrode may contain 80% by weight of particles having a mean particle size in a range from 0.5 to 6 µm or a blend thereof, or the electrode is made of a insoluble and non-fusible substrate that contains polyacene skeletal structure having a ratio of hydrogen atoms/carbon atoms in a range from 0.50 to 0.05 made by a heat treatment of aromatic condensation polymer.

Factors that determine the time constant of a cell include all that can affect the impedance and capacity of the cell. That is, time constant of the cell is determined by the total effects of design factors including the cell configuration such as coin type or cylindrical type, materials that make the constituent factors such as separator, electrolytic liquid and electrode, construction of the outer casing and production engineering factors such as packing ratio.

Among the EDLC that are commercialized at present, variations in time constant due to difference in the cell construction are in a range from 1 to 50 sec. If particular emphasis in placed on the reduction of impedance, time constant can be decreased with the conventional design by selecting a proper material. In this case, time constant can be decreased down to about 0.1 relatively easily with the conventional low-impedance design.

In order to decrease time constant for further decreasing the impedance and optimizing the capacity, it is effective to decrease the thickness of the electrode active material layers. Although decreasing the thickness of the electrode active material layers results in decreased capacity per unit cell volume, impedance can be decreased because the electrode area increases at the same time. As a result, time constant decreases monotonously as the thickness of the electrode active material layers decreases. Therefore, control of the thickness of the electrode active material layers can be regarded as an effective means for optimizing the time constant of the cell in accordance with the target load width. In the cell construction of an embodiment to be described later, for example, time constant can be decreased as $\tau=0.05$ when the thickness of electrode active material layer is 16 µm, $\tau=0.03$ when the thickness is from 8 to 10 µm, and $\tau=0.005$ when the thickness is from 1 to 2 µm.

However, the effect of increasing the electrode area, that is achieved by decreasing the thickness of the electrode active material layer, depends on the thickness of members that constitute the element, other than the electrode active material layer, such as the electrode substrate and separator. For example, when the electrode substrate is 17 µm thick and the separator is 25 µm, the electrode area can be increased by about 30% by decreasing the thickness of the electrode active material layer from 10 µm to 1 µm. However, decreasing the thickness further to 0.1 µm yields an effect of increasing the area merely by about 1%. As a result, no significant effect of decreasing the impedance can be achieved when the electrode thickness of the active material layer is 1 µm or less, although capacity decreases and therefore time constant decreases because the amount of the active material decreases monotonously as the thickness of the electrode active material layer decreases. The range of the thickness of the electrode active material layer wherein time constant cannot be decreased below 0.00002 is believed to be above 0.01 µm.

In such a case as the effects of increasing the electrode area and decreasing the cell volume cannot be achieved simply by decreasing the capacity as in the case of the thickness of the electrode active material layer below 1 µm, however, much effect of improving the discharge performance cannot be expected even when the time constant is optimized for load width. The extent of decreasing thickness of the electrode active material layer, that has significant effect of improving the discharge performance for a load width on the order of milliseconds, is determined by the ratio of the thickness of the electrode active material layers to the thickness of members that constitute the element.

In case the active material is very expensive, however, it has an effect of decreasing the material cost. When the thickness of the electrode active material layers is below 1 µm, it is more important to design correspondingly thin electrode substrate and separator for improving the discharge performance.

The thickness of the electrode active material layer is also closely related to the mean particle size of the active material and the limit to the coat thickness is determined by the mean particle size of the active material. Usually, a powder having a mean particle size from 8 to 10 μm should be used when forming a coat having a thickness of several tens to 100 μm. According to the present invention, the thickness of one side of the electrode active material layer is preferably in a range from 0.01 μm up to 16 μm, and more preferably in a range from 0.05 μm up to 10 μm.

The electrode active material layer of the thickness within 16 μm is preferably formed by printing, in consideration of productivity in mass production. Thus the amount of binder and solid content of slurry are determined accordingly. Preferably, the amount of the binder is in a range from 5% to 30% by weight of the PAS powder, and the solid content of a slurry is in a range from 10% to 30%.

Examples of the electrode active material used in the present invention include porous carbon such as active carbon, polyacenic substance, tin oxide and silicon oxide. Among these electrode active materials, preferable one is an insoluble and non-fusible substrate that contains polyacene skeletal structure having an atomic ratio of hydrogen atoms/carbon atoms in a range from 0.50 to 0.05 and is made by a heat treatment of an aromatic condensation polymer.

The aromatic polymer is a condensate of an aromatic hydrocarbon compound having a phenolic hydroxyl group with aldehydes. Preferable aromatic hydrocarbon compound include, but is not limited to, so-called phenols such as phenol, cresol, and xylenol. Phenols, particularly phenol is particularly suited for practical use.

As the aromatic condensation polymer in the present invention, for example, there can be used a modified aromatic condensation polymer, which is prepared by substituting a portion of the above aromatic hydrocarbon compound having a phenolic hydroxyl group with an aromatic hydrocarbon compound having no phenolic hydroxyl group such as xylene, toluene or aniline, for example, a condensate of phenol, xylene with formaldehyde; and a modified aromatic condensation polymer prepared by substituting with melamine or urea.

As the aldehyde, formaldehyde, acetylaldehyde or furfural can be used. Among these aldehydes, formaldehyde is preferable. The phenol formaldehyde condensate may be a novolak type condensate, a resole type condensate or a mixture thereof.

The insoluble and non-fusible substrate is obtained by a heat treatment of aromatic condensation polymer, and contains all insoluble and non-fusible substrate that have a polyacene skeletal structure described in Japanese Examined Patent Publication No. 1-44212 and Japanese Examined Patent Publication No. 3-24024. An active material that has polyacene skeletal structure provides high capacity, which is advantageous for decreasing the electrode volume while maintaining a required capacity.

BEST MODE FOR CARRYING OUT THE INVENTION

The insoluble and non-fusible substrate according to the present invention is obtained by a heat treatment of aromatic condensation polymer and can be prepared, for example, as described below.

The aromatic condensation polymer described above is gradually heated to a temperature in a range from 400 to 900° C. in a non-oxidizing atmosphere (vacuum included), and an insoluble and non-fusible substrate having a ratio of hydrogen atoms/carbon atoms (hereinafter referred to as H/C) in a range from 0.50 to 0.05, preferably from 0.35 to 0.10 is obtained.

The insoluble and non-fusible substrate described above shows an X-ray diffraction peak (CuKα) at the position 2 θ of within 24°, with other broader peak appearing in a space between 41 and 46° of the main peak.

Thus it is supposed that the insoluble and non-fusible substrate has polyacene skeletal structure formed through development of aromatic polycyclic structure, and is amorphous, which is useful as an electrode active material because of the capability of stable doping and undoping of ions.

The insoluble and non-fusible substrate has a value of H/C preferably in a range from 0.50 to 0.05. When the value of H/C is higher than 0.50, it means that the aromatic polycyclic structure has not fully developed and therefore satisfactory doping and undoping of lithium cannot be done, thus resulting in such a problem that the efficiency of charging and discharging becomes low when the material is used to assemble a cell. When the value of H/C is lower than 0.05, on the other hand, resultant cell of the present invention has a low capacity.

There is no limitation to the shape of the electrode active material used in the present invention, such as powder, short fibers, etc., as long as it can be formed by molding.

The electrode of the present invention is made by mixing the electrode active material, a specified binder and a solvent to form a slurry, applying the slurry to a current collector made of metal foil having a conductive thin film, and drying the coat and, as required, pressing.

While various resin binders may be used according to the present invention, a polymer containing fluorine is preferably used, and particularly polyvinylidene fluoride is preferably used. For the solvent used to form the slurry, fluorine-based polymer is preferably employed for binder, and N,N-dimethylformaldehyde or N-methyl pyrrolidone may be preferably used. The charge collector is made of a metal foil having electrically conductive thin film. The metal foil is preferably one that is resistant to corrosion namely a metal such as, for example, aluminum, copper, stainless steel or nickel, among which aluminum foil is preferable for the reason of resistance against oxidization and lower weight. The thickness of the aluminum foil is preferably in a range from 17 to 30 μm, while it depends on the productivity and packing ratio.

According to the present invention, the separator that constitutes the cell is preferably made of electrolytic capacitor paper. Particularly electrolytic capacitor paper having a thickness in a range from 25 to 40 μm is suitable in consideration of insulation performance and low impedance. For the electrolytic solution, such an organic electrolytic solution is suitable that is made by dissolving 1.5 moles/liter of TEMA salt or 1.4 to 2.5 moles/liter of amidine salt in propylene carbonate.

The electrode of the present invention can be made as follows. First, the electrode active material described above, the fluorine-based polymer described above and a solvent are mixed to form a slurry. While viscosity, solid content and binder content of the slurry vary depending on the shape of the molded electrode, intended electrical and physical properties and the process selected for coating the electrode, it is preferable that the thickness of one side of the electrode active material layer is in a range from 0.01 to 16 μm, preferably from 0.05 to 10 μm.

The organic electrolyte cell of the present invention described above is used with the thin films formed on both sides being used as the positive and negative electrodes. The positive and negative electrodes, opposing each other via the separator interposed therebetween, are wound with a proper tension so as to make the element that is then dried extensively so as to remove NMP and moisture from the element, impregnated with the electrolytic solution and is sealed in an outer case, thereby completing the organic electrolyte cell. The outer casing may be a cylindrical can made of nickel-plated steel that is welded with a negative electrode terminal to become a negative electrode can, which is capped by crimping an aluminum lid with a positive electrode terminal welded thereon having an insulating gasket made of polypropylene used as the positive electrode, or an aluminum-laminated film or the like having a fusible layer that can be fused with heat may be used as the casing material. Alternatively, an outer casing made of aluminum that is crimping over a sealing, which is rubber similar to the structure of cylindrical electrolyte capacitor may also be employed. The positive and negative electrodes are provided with current lead-out terminals welded onto the aluminum substrate. Terminals are welded by resistance welding, ultrasonic welding or the like to uncoated portions of the electrode layer formed by gravure printing. The terminals may also be joined by mechanically applying a pressure to the terminal against the electrode. An aluminum terminal is used for the positive electrode and a nickel terminal is used for the negative electrode.

There is no limitation to the type of the cell according to the present invention, which may be coin type, cylindrical, square or any other shape as long as the basic constitution described above can be satisfied.

INDUSTRIAL APPLICABILITY

In the present invention, since the organic electrolyte cell is characterized in that the product $\tau=R \cdot C$ of an impedance R ($\Omega$) and a capacity C (F) is in a range from 0.00002 to 0.05 (Q·F), higher backup power supply capability was obtained compared to the conventional design, by improving the balance of voltage drop during discharge over a specified load width on the order of milliseconds.

The present invention will be described in detail by way of examples. However, the present invention is not limited to these examples.

EXAMPLE 1

(Production of Electrode)

A solution prepared by mixing a water-soluble resol (concentration: about 60%), zinc chloride and water in proportions of 10:25:4 by weight was poured into a mold measuring 100 mm×100 mm×2 mm that was then covered with a glass plate to prevent evaporation of water and was heated at about 100° C. for one hour to solidify the liquid.

The phenol resin was put into a silicon unit electric furnace and was heated at a rate of 40° C./hour in nitrogen gas flow to apply heat treatment at 500° C. After the heat treatment, the resin was washed in dilute hydrochloric acid, then washed in water and dried to obtain PAS plate. The PAS thus obtained was crushed with a nylon ball mill or a disk mill, to obtain two kinds of PAS powder having a mean particle size of 1 μm and 4 μm depending on the crushing condition. These powders were mixed in proportions of 1 am: 4 μm=1:2.

100 parts by weight of the PAS powder thus obtained and 15 parts by weight of polyvinylidene fluoride and 345 parts by weight of N-methyl pyrrolidone were mixed to make a slurry including 25% of solid content. Then an electrically conductive paste, Varniphite T602 manufactured by Nippon Graphite Industries, Ltd., was applied to a current collector made of aluminum foil having a thickness of 17 μm to form electrically conductive thin films on both sides each 2 μm thick, over which the slurry was applied by doctor blade on a glass plate and was dried at 70° C. in inert nitrogen atmosphere for 30 minutes to form an electrode active material layer having a thickness of 1 to 2 μm on one side. This process was carried out on both sides.

(Production of Cell)

The electrode made as described above was cut so that coated surface measuring 6 mm×200 mm could be obtained, to which tabs made of aluminum and nickel were welded to the positive and negative electrodes, respectively, as current led-out terminals. The electrodes were then dried in vacuum at 140° C. for 12 hours. The electrodes were used as the positive and negative electrodes and were wound to make the element. The element was dried in vacuum at 100° C. for 12 hours, and electrolytic solution that was deaerated in vacuum for about 10 minutes was poured and put into an outer casing thereby to make a prototype of wound type cell. CTF4825 manufactured by Nippon Kodoshi Corporation was used as the separator. An organic electrolytic solution having a concentration of 1.5 moles/liter prepared by using propylene carbonate as the solvent and TEMA salt as the solute was used as the electrolytic solution.

(Measurement of Time Constant)

Impedance R ($\Omega$) of the present invention was measured at 1 kHz. After charging the cell at 2.3 V for 30 minutes, the cell was discharged at a constant current of 1 mA. Gradient of the straight line showing the voltage change with time was determined over an interval from 2.0 V to 1.5 V, thereby calculating the value of capacity C (F). In case the cell is discharged from 2.3 V to 0 V within a period of from about 5 minutes to 30 minutes, discharge current is not set to a particular value, and the voltage interval over which the gradient is determined may be taken wider without affecting the evaluation of the time constant.

Time constant was calculated by multiplying the impedance R ($\Omega$) and capacity F determined as described above. Calculated values of time constant are shown in Table 1.

(Evaluation of Backup Capability)

Backup capability refers to the capability of the cell to maintain voltage when loaded. The smaller the voltage drop of the cell when discharged under load, the higher the backup capability.

After charging the cell at 2.3 V for 30 minutes, the cell was discharged with a constant current of 1000 mA (current density 83 mA/cm$^2$) and voltage drop $\Delta V$ (V) over 1 millisecond was measured. In addition, based on the packing ratio of an electrolytic capacitor measuring 8 mm in outer diameter and 11 mm in height which is available in the market, cell volume was calculated from the volume of the prototype element, that was then multiplied to $\Delta V$, thereby estimating the backup capability per 1 cc of the cell volume. The results are shown in Table 1.

EXAMPLE 2

(Production of Electrode)

The PAS plate made in Example 1 was crushed to obtain PAS powder having a mean particle size of 4 μm. Then an electrode having an active material layer 8 μm in thickness provided on one side thereof was made by the same procedure as in Example 1.

(Production of Cell)

Using the electrode made as described above, a cell was made by the same procedure as in Example 1.

(Measurement of Time Constant)
Time constant was measured in the same manner as in Example 1.

(Evaluation of Backup Capability)
Backup capability was evaluated in the same manner as in Example 1.

EXAMPLE 3

(Production of Electrode)
The PAS plate made in Example 1 was crushed to obtain PAS powder having a mean particle size of 4 μm. Then an electrode having an active material layer 15 μm in thickness provided on one side thereof was made by the same procedure as in Example 1.

(Production of Cell)
Using the electrode made as described above, a cell was made by the same procedure as in Example 1.

(Measurement of Time Constant)
Time constant was measured in the same manner as in Example 1.

(Evaluation of Backup Capability)
Backup capability was evaluated in the same manner as in Example 1.

EXAMPLE 4

(Production of Electrode)
The PAS plate made in Example 1 was crushed to obtain two kinds of PAS powder having a mean particle size of 1 μm and 4 μm, that were mixed in proportions of 1 μm: 4 μm=1:3. Then an electrode having an active material layer 12 μm in thickness provided on one side thereof was made by the same procedure as in Example 1.

(Production of Cell)
Using the electrode made as described above, a cell was made by the same procedure as in Example 1.

(Measurement of Time Constant)
Time constant was measured in the same manner as in Example 1.

(Evaluation of Backup Capability)
Backup capability was evaluated in the same manner as in Example 1.

EXAMPLE 5

(Production of Electrode)
The PAS plate made in Example 1 was crushed to obtain PAS powder having a mean particle size of 1 μm. Then a slurry including 20% of solid content was prepared by the same procedure as in Example 1, and was left to stand still for 48 hours or more. Then the supernatant of this liquid, discarding the precipitation, was used to form an active material layer having a thickness of 0.5 μm on one side by means of a bar coater, thereby to obtain an electrode.

(Production of Cell)
Using the electrode made as described above, a cell was made by the same procedure as in Example 1.

(Measurement of Time Constant)
Time constant was measured in the same manner as in Example 1.

(Evaluation of Backup Capability)
Backup capability was evaluated in the same manner as in Example 1.

EXAMPLE 6

(Production of Electrode)
The PAS plate made in Example 1 was crushed to obtain PAS powder having a mean particle size of 1 μm. Then a slurry including 20% of solid content was prepared by the same procedure as in Example 1, and was used to form an electrode active material layer having a thickness of 3 μm on one side by means of a bar coater, thereby to obtain an electrode similarly to Example 5.

(Production of Cell)
Using the electrode made as described above, a cell was made by the same procedure as in Example 1.

(Measurement of Time Constant)
Time constant was measured in the same manner as in Example 1.

(Evaluation of Backup Capability)
Backup capability was evaluated in the same manner as in Example 1.

EXAMPLE 7

(Production of Electrode)
The PAS plate made in Example 1 was crushed to obtain PAS powder having a mean particle size of 1 μm. Then an electrode active material layer having a thickness of 0.5 μm was formed only on one side by the same procedure as in Example 5.

(Production of Cell)
Using the electrode made as described above, a cell was made by the same procedure as in Example 1.

(Measurement of Time Constant)
Time constant was measured in the same manner as in Example 1.

(Evaluation of Backup Capability)
Backup capability was evaluated in the same manner as in Example 1.

COMPARATIVE EXAMPLE 1

(Production of Electrode)
The PAS plate made in Example 1 was crushed to obtain PAS powder having a mean particle size of 8 μm. Then an electrode having active material layer 25 μm in thickness being formed on one side thereof was made by the same procedure as in Example 1.

(Production of Cell)
Using the electrode made as described above, a cell was made by same procedure as in Example 1.

(Measurement of Time Constant)
Time constant was measured in the same manner as in Example 1.

(Evaluation of Backup Capability)
Backup capability was evaluated in the same manner as in Example 1.

COMPARATIVE EXAMPLE 2

(Production of Electrode)

The PAS plate made in Example 1 was crushed to obtain PAS powder having a mean particle size of 8 μm. Then an electrode having active material layer 60 μm in thickness being formed on one side thereof was made by the same procedure as in Example 1.

(Production of Cell)

Using the electrode made as described above, a cell was made by the same procedure as in Example 1.

(Measurement of time constant)

Time constant was measured in the same manner as in Example 1.

(Evaluation of Backup Capability)

Backup capability was evaluated in the same manner as in Example 1.

COMPARATIVE EXAMPLE 3

Backup capability was evaluated on a commercialized electrolytic capacitor having volume of 0.824 cc, rated voltage of 6.3 V and capacity of 150 μF. Impedance of this capacitor at 1 kHz was measured. By multiplying the impedance and the rated capacity, time constant of $4.2 \times 10^{-6}$ (Ω·F) was determined.

(Evaluation of Backup Capability)

After charging the cell at 2.3 V for 30 minutes, the cell was discharged with a constant current of 100 mA and voltage drop ΔV (V) over 1 millisecond was measured. Then cell volume was calculated from the volume of the electrode volume that was multiplied to ΔV, thereby estimating the backup capability per 1 cc of the cell volume.

COMPARATIVE EXAMPLE 4

Backup capability was evaluated on a commercialized electrical double layer capacitor having volume of 1.1 cc, rated voltage of 2.5 V and capacity of 1 F. Impedance of this capacitor at 1 kHz was measured. By multiplying the impedance and the rated capacity, time constant of 0.12 (Ω·F) was determined.

(Evaluation of Backup Capability)

After charging the cell at 2.3 V for 30 minutes, the cell was discharged with a constant current of 1000 mA and voltage drop ΔV (V) over 1 millisecond was measured. Then cell volume was calculated from the volume of the electrode volume that was multiplied to ΔV, thereby estimating the backup capability per 1 cc of the cell volume. Results of Examples 1 to 7 and Comparative Examples 1 to 4 are shown in Table 1 and Table 2.

TABLE 1

| | Mean particle size of active material (μm) | Thickness of active material layer on one side (μm) | Time constant (Ω · F.) |
|---|---|---|---|
| Example 1 | 1 μm:4 μm = 1:2 | 1-2 | 0.005 |
| Example 2 | 4 | 8-10 | 0.03 |
| Example 3 | 4 | 15 | 0.05 |
| Example 4 | 1 μm:4 μm = 1:3 | 12 | 0.04 |
| Example 5 | 1 | 0.5 | 0.006 |
| Example 6 | 1 | 3 | 0.014 |
| Example 7 | 1 | 0.5 | 0.004 |
| Comparative Example 1 | 8 | 25 | 0.07 |
| Comparative Example 2 | 8 | 60 | 0.287 |
| Comparative Example 3 | — | — | $4.2 \times 10^{-6}$ |
| Comparative Example 4 | — | — | 0.12 |

TABLE 2

| | Balance of voltage drop Vr/Vc | Backup capability per 1 cc of cell volume ΔV (mV · cc) |
|---|---|---|
| Example 1 | 5 | 59 |
| Example 2 | 30 | 67 |
| Example 3 | 50 | 73 |
| Example 4 | 40 | 57 |
| Example 5 | 6 | 46 |
| Example 6 | 14 | 31 |
| Example 7 | 4 | 78 |
| Comparative Example 1 | 70 | 120 |
| Comparative Example 2 | 287 | 202 |
| Comparative Example 3 | 4200 | 557 |
| Comparative Example 4 | 116 | 130 |

From Table 1 it can be seen that Examples 1 to 7 having electrode active material layers of the thickness not larger than 16 μm and time constant of 0.05 or less have higher backup capability than Comparative Examples 1 to 4. The electrolytic capacitor of Comparative Example 3 showed an excessive voltage drop under the same discharging conditions as the other samples, was therefore tested with one tenth of current but still showed the largest voltage drop. The sample of Comparative Example 2 had a capacity about 50 times that of Example 1, but showed backup capability of only about one third because of poor balance of voltage drop.

The results described above show that balance of voltage drop can be improved by optimizing the time constant for the given load width and, as a result, backup capability is improved and the active material can be reduced, thus allowing a cell design that decreases both the cell size and the manufacturing cost.

Thus the organic electrolyte cell that can be preferably used in backup of pulse load is obtained by optimizing the time constant in accordance to the load conditions.

The invention claimed is:

1. An organic electrolyte cell comprising:
   a positive electrode comprised of an electrode substrate and an active material layer formed thereon,
   a negative electrode comprised of an electrode substrate and an active material layer formed thereon, and
   an organic solvent solution prepared by dissolving a salt in an aprotic organic solvent, said organic solvent solution present between the active material layers of the positive electrode and the negative electrode facing each other,
   wherein the active material layer of each positive and negative electrode is made from the same insoluble and non-fusible substrate that contains a polyacene skeletal structure having an atomic ratio of hydrogen atoms/carbon atoms in a range from 0.50 to 0.05, has a thickness in a range from 0.01 to 16 µm, and contains particles of which 80% by weight fall in a range from 0.5 to 6 µm of the particle size distribution, wherein the value of $\tau$, the product R·C of an impedance R($\Omega$) and a capacity C(F), is set in a range from 0.00002 to 0.05.

2. The organic electrolyte cell according to claim 1, wherein the thickness of each active material layer is 0.05 to 10 µm.

3. The organic electrolyte cell according to claim 2, wherein the thickness of each active material layer is 0.08 to 2 µm.

4. The organic electrolyte cell according to claim 1, wherein the value of $\tau$ is 0.000 1 to 0.03.

5. The organic electrolyte cell according to claim 1, further comprising a separator interposed between the negative and positive electrodes, said separator being an electrolytic capacitor paper.

6. The organic electrolyte cell according to claim 5, wherein the electrolytic capacitor paper has a thickness of 25 to 40 µm.

7. The organic electrolyte cell according to claim 1, wherein the electrode substrate of each negative and positive electrode is a metal foil made of the same metal.

8. The organic electrolyte cell according to claim 7, wherein the electrode substrate has a thickness of 17 to 30 µm.

9. The organic electrolyte cell according to claim 1, wherein the active material layer of each negative and positive electrode is a first active material layer, and each negative and positive electrode further comprises a second active material layer formed on a side of the electrode substrate opposite the first active material layer.

10. The organic electrolyte cell according to claim 9, wherein the negative and positive electrodes are wound together to arrange the second active material layers of the negative and positive electrodes face each other, between which the organic solvent solution is present.

* * * * *

UNITED STATES PATENT AND TRADEMARK OFFICE
CERTIFICATE OF CORRECTION

PATENT NO.        : 7,445,870 B2
APPLICATION NO.   : 10/476054
DATED             : November 4, 2008
INVENTOR(S)       : Tomohiro Taguchi, Kenichiro Nakahara and Yukinori Hato It is certified that error appears in the above-identified patent and that said Letters Patent is hereby corrected as shown below:

In Claim 4 in line 17 of column 13, please remove a space between "0" and "1" to be shown as --0.0001--.

In Claim 10 in line 18 of column 14, please correct the word "face" to --facing--.

Signed and Sealed this

Thirtieth Day of December, 2008

JON W. DUDAS
*Director of the United States Patent and Trademark Office*